(12) United States Patent
Kondo et al.

(10) Patent No.: US 7,940,497 B2
(45) Date of Patent: May 10, 2011

(54) MAGNETIC HEAD DEVICE HAVING REAR POSITIVE PRESSURE SURFACE AND REAR SIDE POSITIVE PRESSURE SURFACE

(75) Inventors: Yasuyuki Kondo, Niigata-ken (JP); Junsei Ueda, Niigata-ken (JP); Shouhei Ueda, legal representative, Fukushima-ken (JP); Mihoko Ueda, legal representative, Fukushima-ken (JP); Hirohisa Ishihara, Niigata-ken (JP)

(73) Assignee: TDK Corporation, Tokyo (JP)

( * ) Notice: Subject to any disclaimer, the term of this patent is extended or adjusted under 35 U.S.C. 154(b) by 623 days.

(21) Appl. No.: 11/562,200

(22) Filed: Nov. 21, 2006

(65) Prior Publication Data

US 2007/0121238 A1 May 31, 2007

(30) Foreign Application Priority Data

Nov. 21, 2005 (JP) ................................. 2005-335605

(51) Int. Cl.
*G11B 5/60* (2006.01)
(52) U.S. Cl. ..................................................... 360/235.7
(58) Field of Classification Search .............. 360/235.5, 360/235.6, 235.7, 235.8, 235.9, 236, 236.1, 360/236.2, 236.3
See application file for complete search history.

(56) References Cited

U.S. PATENT DOCUMENTS

| | | | | |
|---|---|---|---|---|
| 6,021,020 A * | 2/2000 | Itoh et al. | .................. | 360/236.1 |
| 7,106,556 B2 * | 9/2006 | Pendray et al. | .................. | 360/235.8 |
| 7,230,797 B1 * | 6/2007 | Liu | .................. | 360/235.8 |
| 7,583,473 B2 * | 9/2009 | Bolasna et al. | .................. | 360/236.2 |
| 2004/0027724 A1 | 2/2004 | Pendray et al. | | |
| 2004/0150916 A1 | 8/2004 | Rao et al. | | |
| 2004/0201923 A1 * | 10/2004 | Rao et al. | .................. | 360/235.7 |
| 2004/0264053 A1 * | 12/2004 | Pendray et al. | .................. | 360/236.3 |
| 2006/0114611 A1 * | 6/2006 | Zhu et al. | .................. | 360/235.7 |
| 2006/0238922 A1 * | 10/2006 | Hanyu | .................. | 360/235.8 |
| 2008/0112084 A1 * | 5/2008 | Hu et al. | .................. | 360/234.3 |
| 2008/0112086 A1 * | 5/2008 | Hu et al. | .................. | 360/235.6 |

FOREIGN PATENT DOCUMENTS

| | | |
|---|---|---|
| JP | 61-160885 | 7/1986 |
| JP | 10-283622 | 10/1998 |
| JP | 2004071140 | 3/2004 |

OTHER PUBLICATIONS

English translation of previously submitted Office Action issued in corresponding Japanese Patent Application No. 2005-335605; issued Sep. 12, 2008.

* cited by examiner

*Primary Examiner* — Craig A. Renner
(74) *Attorney, Agent, or Firm* — Brinks Hofer Gilson & Lione (57) ABSTRACT

A magnetic head device is provided. A slider of a magnetic head device has a side that faces a recording medium and on which a first positive pressure is exerted on the leading side and a second positive pressure is exerted on the trailing side. In the area between the first positive pressure area and the second positive pressure area, a small second negative pressure is created at the front. A first negative pressure larger than the second negative pressure is created at the rear. A third positive pressure is exerted on both sides of the first negative pressure area. When air density decreases, the small second negative pressure in a middle area and the large first negative pressure at the rear of the second negative pressure area stabilize the pitch angle of the slider and prevent an excessive decrease in the flying distance of a trailing end portion.

10 Claims, 7 Drawing Sheets

MAGNETIC HEAD DEVICE HAVING REAR POSITIVE PRESSURE SURFACE AND REAR SIDE POSITIVE PRESSURE SURFACE

This patent document claims the benefit of Japanese Patent Application No. 2005-335605 filed Nov. 21, 2005, which is hereby incorporated by reference.

BACKGROUND

1. Field

The present embodiments relate to a magnetic head device.

2. Related Art

Generally, a magnetic head device that includes a slider facing a magnetic recording medium and is provided with a magnetic functional unit on a trailing end thereof is used for reading a magnetic signal from and writing a magnetic signal to a magnetic recording medium, such as a hard disk. The magnetic functional unit includes a reproducing functional part using a magnetoresistive (MR) effect or a giant magnetoresistive (GMR) effect, and a recording functional part composed of a yoke, a coil, and the like that are made of magnetic material and formed of thin films.

The slider of the magnetic head device is pressed against a surface of the magnetic recording medium by an elastic member that is referred to as a load beam. When the magnetic recording medium rotates, airflow (air bearing) running into the space between the surface of the magnetic recording medium and the slider causes the slider to fly above the magnetic recording medium and provides a predetermined flying height between the magnetic functional unit and the magnetic recording medium.

Generally, in a slider of a magnetic head device of this type, a surface facing a recording medium has a positive-pressure surface that allows a flying pressure to be created by airflow, and a negative-pressure-generating surface recessed from the positive-pressure surface. A balance between flying force exerted on the positive-pressure surface and attractive force generated on the negative-pressure-generating surface and directed toward the recording medium allows the slider to be brought to a proper position above the surface of the recording medium and to maintain a stable flying height.

Recently, in order to increase the magnetic recording density and to achieve high-speed recording and reproduction of magnetic signals, a magnetic head device is configured such that the flying height of a magnetic functional unit of the magnetic head device from the recording medium is minimized.

Japanese Unexamined Patent Application Publication No. 10-283622 discloses a magnetic head device that is designed not only to reduce a flying height from a recording medium, such as a hard disk, but also to stabilize the flying height during seek operation in which a magnetic head moves between the inner radius and the outer radius of the recording medium, and specifically to reduce variations in yaw angle.

This magnetic head device has a front dynamic-pressure-generating part on which flying force is exerted, a rear dynamic-pressure-generating part for creating a negative pressure, and a deep cavity located between the front and rear dynamic-pressure-generating parts and on which virtually no flying force is exerted and no negative pressure is created. Thus, a stable dynamic position of the magnetic head is achieved chiefly by flying force exerted on the front dynamic-pressure-generating part and by the negative pressure created on the rear dynamic-pressure-generating part.

As the flying height of a slider in a magnetic head device has decreased recently, variations in flying height caused by changes in air density are becoming a problem. When the flying height of the slider from a magnetic recording medium is small, the flying height easily decreases in response to a decrease in air density according to altitude. This causes the slider to easily come into contact with the surface of the recording medium when used at a high altitude or in an airplane.

The magnetic head device disclosed in Japanese Unexamined Patent Application Publication No. 10-283622 causes flying force to be exerted on the front dynamic-pressure-generating part and causes a negative pressure to be exerted on the rear dynamic-pressure-generating part, thereby attempting to stabilize the dynamic position of the magnetic head. However, since this magnetic head device has a structure in which a negative pressure is created mainly in the rear dynamic-pressure-generating part, a decrease in air density in the use environment may lead to an excessive decrease in the flying height of the rear dynamic-pressure-generating part.

Japanese Unexamined Patent Application Publication No. 10-283622 discloses another embodiment in which a negative-pressure-generating part is provided in the middle section between the front dynamic-pressure-generating part and the rear dynamic-pressure-generating part. The negative-pressure-generating part in the middle section is expected to contribute to the reduced overall flying height of the magnetic head and to a reduced distance between the magnetic functional unit and the surface of the recording medium. However, since a balance between a negative pressure created on the negative-pressure-generating part in the middle section and a negative pressure created on the rear dynamic-pressure-generating part is not adjusted, the negative-pressure-generating part in the middle section may cause an excessive decrease in the flying height of the magnetic head when air density in the use environment decreases.

SUMMARY

The present embodiments may obviate one or more of the drawbacks of the related art. For example, in one embodiment, a magnetic head device is capable of achieving a low flying height of a magnetic functional unit from a recording medium, and also stabilizes the flying position (pitch angle) of a slider and reduces variations in flying height when air density in the use environment changes.

In one embodiment, a magnetic head device includes a slider having a facing side facing a recording medium and a pressing side on which pressing force directed toward the recording medium is exerted, and a magnetic functional unit mounted on the trailing side of the slider and configured to perform at least one of a magnetic recording function and a magnetic reproducing function. The facing side of the slider has a front section located on the leading side, a rear section located on the trailing side, and a middle section between the front section and the rear section.

The front section is provided with a front positive-pressure surface. The rear section is provided with a rear positive-pressure surface, a rear negative-pressure surface closer to the pressing side than the rear positive-pressure surface is, and a dam portion located forward of the rear negative-pressure surface. The middle section is provided with a central negative-pressure surface closer to the pressing side than the front positive-pressure surface is and configured to cause a negative pressure to develop on at least a boundary with the front positive-pressure surface. A depth from the front positive-pressure surface to the central negative-pressure surface is larger than a depth from the rear positive-pressure surface to the rear negative-pressure surface.

In one embodiment, airflow over the recording medium causes flying force to be exerted on the front positive-pressure surface and the rear positive-pressure surface. The rear negative-pressure surface and the central negative-pressure surface cause attractive force toward the recording medium to develop. Attractive force created on the rear negative-pressure surface is larger than that created on the central negative-pressure surface.

In one embodiment, airflow (air bearing) moving over the recording medium causes flying force to be exerted on the front and rear positive-pressure surfaces. The magnetic head device stabilizes the flying position while keeping the balance of the pitch angle (i.e., the angle of inclination in the front and rear direction from the trailing side to the leading side) by flying force exerted on the front part and flying force exerted on the rear part. Moreover since the rear negative-pressure surface is provided in the rear section, the flying distance from the recording medium to the magnetic functional unit in the rear section can be stabilized by the balance between flying force exerted on the rear positive-pressure surface and attractive force created on the rear negative-pressure surface.

If the magnetic head device is used, for example, at a high altitude or in an airplane, and air density in the use environment decreases, the flying force exerted on the rear positive-pressure surface decreases. However, since the attractive force created on the rear negative-pressure surface also decreases, variations in the flying distance of the magnetic functional unit can be reduced. Since the central negative-pressure surface causes a small negative pressure to develop behind the front positive-pressure surface, the flying force exerted on the front positive-pressure surface and the small negative pressure caused by the central negative-pressure surface reduce variations in pitch angle when air density decreases. Thus, even if air density decreases, excessive variations in the flying position of the magnetic head can be prevented.

In one embodiment, it is preferable that a front end of an area in which flying force is exerted on the rear positive-pressure surface and a front end of an area in which attractive force is created on the rear negative-pressure surface are spaced in a front and rear direction.

In this embodiment, airflow over the surface of the recording medium causes "front positive pressure", "relatively small negative pressure", "relatively large negative pressure", and "rear positive pressure" to be exerted, in this order, on the facing side of the magnetic head device from the leading side toward the trailing side. The flying position of the magnetic head device over the recording medium is chiefly determined by the "front positive pressure" and "rear positive pressure". However, when the flying force caused by the front and rear "positive pressures" decreases in response to a decrease in air density, the "relatively small negative pressure" and "relatively large negative pressure" and their resulting attractive force also decrease in the middle area between the front and rear "positive pressures". This eases the control of variations in flying position.

Figure 3:
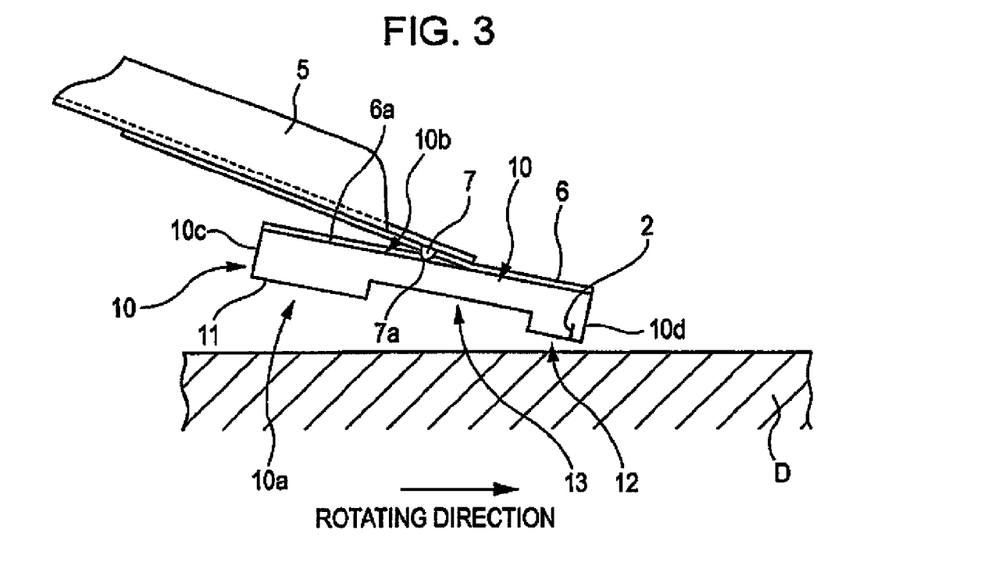
FIG. 3 is a side view of one embodiment of a supporting device that supports the magnetic head device.

The magnetic head device is lifted off the recording medium by the flying force caused by the "front positive pressure" and the flying force caused by the "rear positive pressure", while the leading side of the magnetic head device is pushed by airflow coming from the leading side and raised to a higher position, as shown in FIG. 3. Since the negative-pressure-generating area is located in the middle area where air is received when the magnetic head device is in the tilt position, a decrease in air density reduces attractive force in the negative-pressure-generating area. Variations in the position of the magnetic head device (i.e., variations in pitch angle) can thus be reduced. In the middle of the front and rear "positive pressures", the "relatively small negative pressure" is created in the front area distant from the recording medium, while the "relatively large negative pressure" is created in the rear area close to the recording medium. Therefore, when the density of air received in the middle area of the magnetic head device decreases, a decrease in flying force exerted on the front and rear positive-pressure surfaces can be balanced with a decrease in attractive force exerted on the middle area, and it becomes easier to stabilize the flying position of the magnetic head device.

In one embodiment, it is preferable, in order to stabilize the flying position of the magnetic head when air density changes, that a depth from the front positive-pressure surface to the central negative-pressure surface falls within the range of 1.2 $\mu$m to 5.0 $\mu$m, and a depth from the rear positive-pressure surface to the rear negative-pressure surface falls within the range of 0.5 $\mu$m to 1.4 $\mu$m. It is also preferable that the ratio of a depth between the rear positive-pressure surface and the rear negative-pressure surface to a depth between the front positive-pressure surface to the central negative-pressure surface falls within the range of 0.2 to 0.8.

In one embodiment, it is preferable that the front section is provided with a front step surface forward of the front positive-pressure surface; and that a depth from the rear positive-pressure surface to the rear negative-pressure surface is larger than a depth from the front positive-pressure surface to the front step surface.

When the recording medium starts rotating, the front step surface in the front section allows air to be brought, from the front step surface, into the space between the facing side of the magnetic head device and the recording medium, causes the leading side to be immediately lifted, and allows easy transition to the flying position. The depth from the front positive-pressure surface to the front step surface has an effect on flying force exerted on the front section when the magnetic head device flies, and thus has an effect on the pitch angle when the magnetic head device is in the flying position.

In one embodiment, since the front step surface is closer to a positive pressure surface than the rear negative-pressure surface is, variations in flying position in response to a decrease in air density can be reduced.

In one embodiment, it is preferable, in order to stabilize the flying position, that a depth from the front positive-pressure surface to the front step surface falls within the range of 0 $\mu$m to 0.3 $\mu$m.

In one embodiment, the magnetic head device further includes an air guiding channel extending from the middle section to the rear positive-pressure surface.

The air guiding channel enhances the supply of airflow to the rear positive-pressure surface and thus prevents, when air density decreases, an excessive decrease in flying force exerted on the rear positive-pressure surface.

In another embodiment, it is preferable that the rear section is provided with rear side positive-pressure surfaces between which a centerline extends from the leading side to the trailing side.

With the rear side positive-pressure surfaces, it becomes easy to reduce variations in roll angle about the centerline of the slider.

In another embodiment, it is preferable that the rear side positive-pressure surfaces are located on corresponding sides of the rear negative-pressure surface.

In another embodiment, airflow over the surface of the recording medium causes the "front positive pressure", "relatively small negative pressure", "relatively large negative pressure", and "rear positive pressure" to be exerted, from the leading side in this order, on the facing side of the magnetic head device. The rear side positive-pressure surfaces cause "side positive pressures" to develop on the respective left and right sides of the "relatively small negative pressure". In this embodiment, the "front positive pressure" and the "rear positive pressure" determine the flying position of the magnetic head. When air density decreases, a balance between the "relatively large negative pressure" and "side positive pressures" that are created forward of the "rear positive pressure" allows a decrease in flying force to be balanced with a decrease in attractive force at a position forward of the "rear positive pressure". This reduces variations in flying position determined by the "front positive pressure" and the "rear positive pressure".

In one embodiment, the magnetic head device further includes air guiding channels extending from the middle section to the corresponding rear side positive-pressure surfaces. This minimizes the reduction of the "side positive pressures" when air density decreases.

The present embodiments reduce the flying height of a magnetic functional unit and stabilize the flying position of a magnetic head and prevents an excessive decrease in flying height when air density decreases. Therefore, when the magnetic head device is used in an environment, such as at a high altitude or in an airplane, where the air density is low, the flying height of the magnetic functional unit from the recording medium is ensured and it becomes easy to avoid risks, such as damage to the recording medium and to the magnetic functional unit.

DETAILED DESCRIPTION

Figure 1:
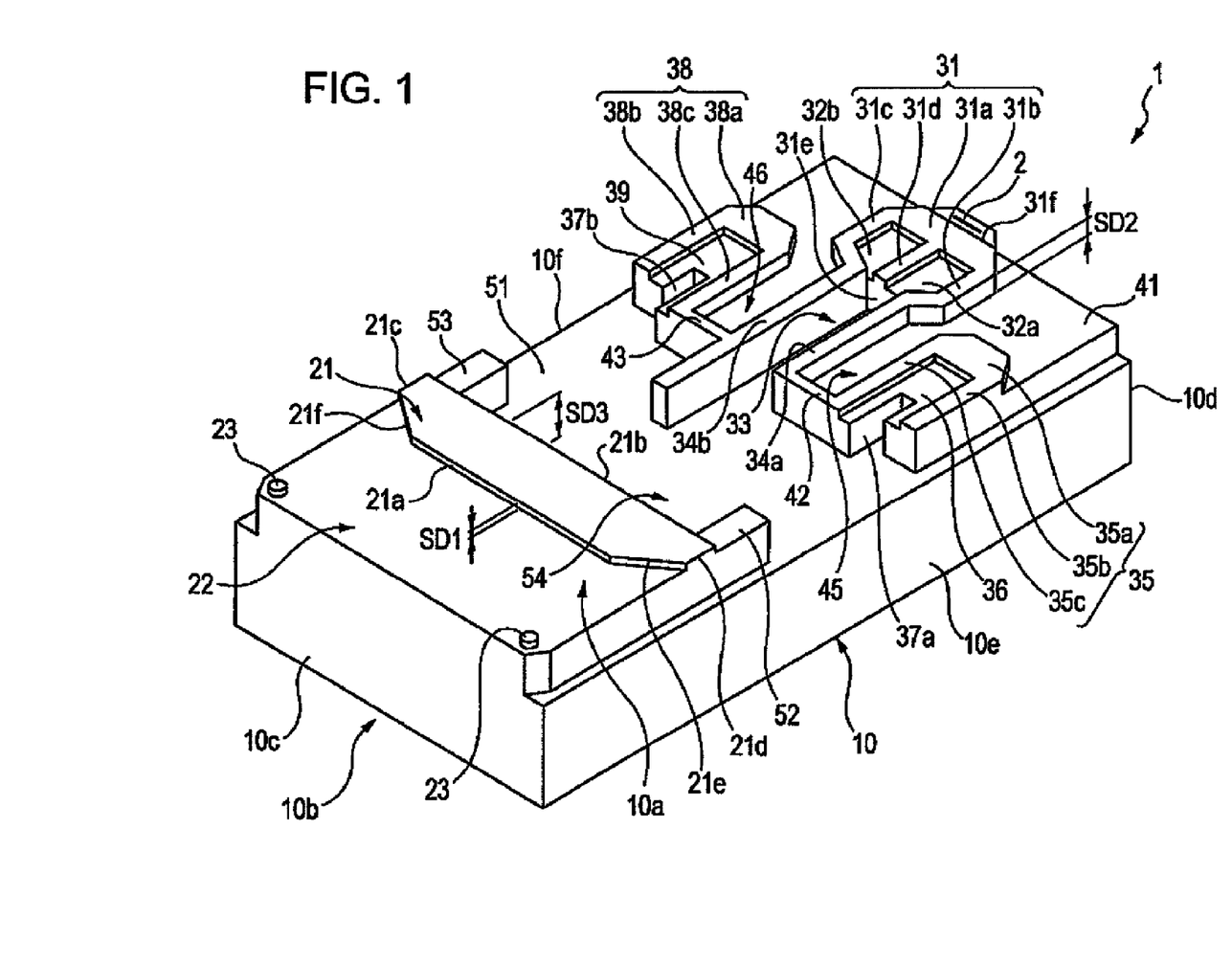
FIG. 1 is an oblique perspective view showing a magnetic head device according to one embodiment.
Figure 2:
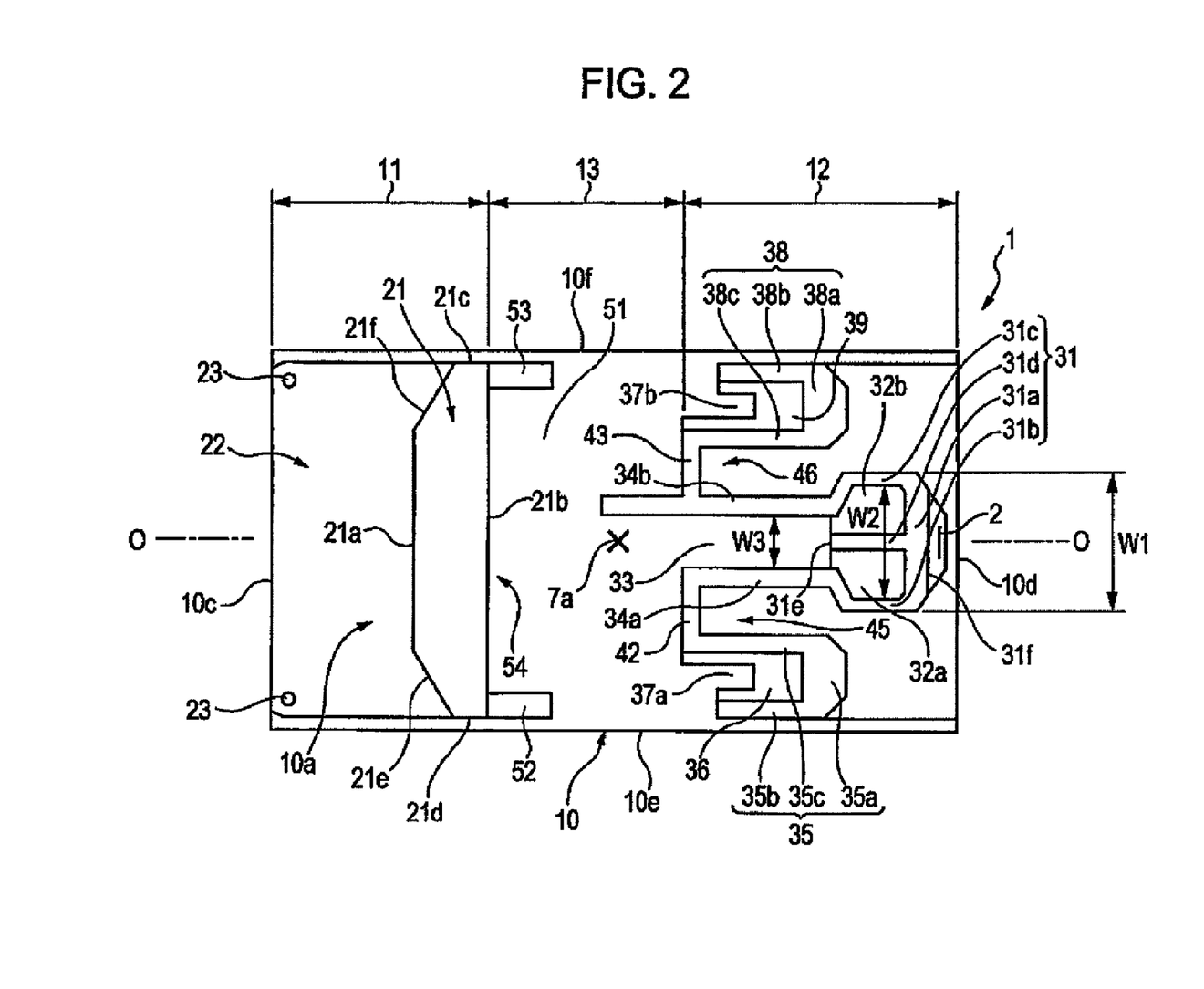
FIG. 2 is a plan view showing one embodiment of the magnetic head device of the embodiment as viewed from the facing side.

In one embodiment, as shown in FIG. 1 and FIG. 2, a magnetic head device 1 includes a cubic-shaped slider 10 made of alumina titanium carbide ($Al_2O_3$—TiC) or the like and a magnetic functional unit 2 mounted on the slider 10.

The magnetic functional unit 2 includes a reading functional part configured to read magnetic signals recorded in a recording medium D using an MR effect, a GMR effect, or a tunnel magnetoresistive (TMR) effect, and a recording functional part that is composed of a yoke of magnetic material and a coil of conductive material, which are fabricated by thin film processing, and configured to write magnetic signals to the recording medium D.

Figure 4:
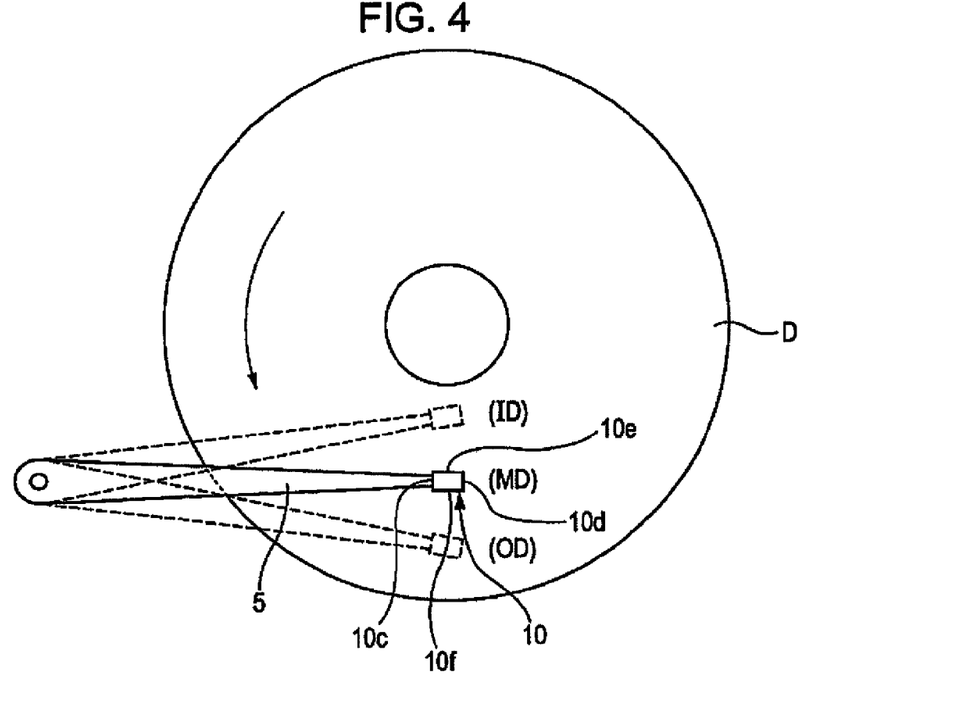
FIG. 4 is a plan view showing one embodiment of a recording medium and the magnetic head device that face each other.

The slider 10 has a facing side 10a that faces the recording medium D, and a pressing side 10b that faces opposite the facing side 10a. The slider 10 has a leading end surface 10c facing toward the direction from which airflow generated over the recording medium D comes, and a trailing end surface 10d from which the airflow exits and on which the magnetic functional unit 2 is mounted. As shown in FIG. 4, the slider 10 has an inner side 10e located on the inner circumferential side (ID side) facing toward the rotational center of the recording medium D, such as a hard disk, and an outer side 10f located on and facing toward the outer circumferential side (OD side) of the recording medium D.

A direction toward the leading end surface 10c may be referred to as a forward direction, an end portion toward the leading end surface 10c may be referred to as a front end, a direction toward the trailing end surface 10d may be referred to as a rearward direction, and an end portion toward the trailing end surface 10d may be referred to as a rear end. A direction parallel to both the leading end surface 10c and the trailing end surface 10d may be referred to as a left and right direction, a side toward the inner side 10e may be referred to as a left side, and a side toward the outer side 10f may be referred to as a right side.

Referring to FIG. 2, a hypothetical line extending from the front end to the rear end and dividing each of the leading end surface 10c and the trailing end surface 10d into two equal halves is a centerline O-O. The center of the magnetic functional unit 2 is located on the centerline O-O.

In one embodiment, as shown in FIG. 3, a supporting device with a load beam 5, which is an elastic supporting member, supports the pressing side 10b of the slider 10. An elastic deformed portion is provided at the base of the load beam 5. A pressing force toward the recording medium D is applied to the slider 10 by elastic force of the elastic deformed portion of the load beam 5. A flexure 6 formed of an elastic plate that has spring properties and is thinner than the load beam 5 is secured to the tip of the load beam 5. A surface on the pressing side 10b of the slider 10 is bonded to a supporting piece 6a bent by the flexure 6.

A pivot 7 projecting downward is integral with the tip of the load beam 5. The pivot 7 is in contact with the surface on the pressing side 10b of the slider 10 or with the supporting piece 6a. An elastic pressing force from the load beam 5 is exerted intensively on a contact point 7a at which the pivot 7 is in contact with the surface on the pressing side 10b of the slider 10. The position of the slider 10, which is secured to the supporting piece 6a that is deformable in all directions, can be changed with the contact point 7a acting as a fulcrum. The position of the slider 10 is changed mainly in a pitch direction in which the centerline O-O tilts and in a roll direction in which the slider 10 tilts about the centerline O-O.

The contact point 7a at which the pivot 7 is in contact with the slider 10 is projected onto the plan view in FIG. 2. The contact point 7a is located on the centerline O-O and substantially at the midpoint between the leading end surface 10c and the trailing end surface 10d.

As shown in FIG. 1 and FIG. 2, the facing side 10a of the slider 10 has a front section 11, a rear section 12, and a middle section 13 located between the front section 11 and the rear section 12. The front section 11 extends from the leading end surface 10c to the point of intersection of a rear end 21b of a front positive-pressure surface 21 (described below) and the centerline O-O. The rear section 12 extends from the trailing end surface 10d to the point of intersection of the centerline O-O and the front end of dams 42 and 43 located forward of side negative-pressure-generating surfaces 45 and 46 (described below). Therefore, the middle section 13 extends from the point of intersection of the rear end 21b and the centerline O-O to the point of intersection of the front end of the dams 42 and 43 and the centerline O-O. The contact point 7a is located in the middle section 13.

The front positive-pressure surface 21 is provided in the front section 11 on the facing side 10a of the slider 10. In the front section 11, the front positive-pressure surface 21, which is a flat surface, is closest to the recording medium D. The term "flat surface" as used in this specification means not only a completely flat surface with an infinite curvature radius but also a curved surface with a very large curvature radius. The front positive-pressure surface 21 has a front end 21a, the rear end 21b, a left end 21d, and a right end 21c. The front end 21a and the rear end 21b are linear and perpendicular to the centerline O-O. The left end 21d is in line with or is located near the inner side 10e of the slider 10. The right end 21c is in line with or is located near the outer side 10f of the slider 10. A front inclined portion 21e is provided between the front end 21a and the left end 21d, and a front inclined portion 21f is provided between the front end 21a and the right end 21c. The rear end 21b of the front positive-pressure surface 21, that is, the boundary between the front section 11 and the middle section 13 is located forward of the contact point 7a of the pivot 7.

There is a front step surface 22 between the front end 21a of the front positive-pressure surface 21 and the leading end surface 10c. The front step surface 22 extends over substantially the entire surface of the front section 11 except the front positive-pressure surface 21. The front step surface 22 is a flat surface that is slightly lower than the front positive-pressure surface 21 and is closer to the pressing side 10b than the front positive-pressure surface 21 is to the pressing side 10b. A depth from the front positive-pressure surface 21 to the front step surface 22 will hereinafter be indicated by SD1. There are projections 23 immediately inside the leading end surface 10c and at the respective left and right ends on the front step surface 22. The surfaces of the respective projections 23 are in the same plane as the front positive-pressure surface 21.

When the recording medium D rotates, with the facing side 10a of the magnetic head device 1 facing toward the recording medium D, airflow (air bearing) passing over the surface of the recording medium D causes a positive pressure to develop in the front section 11 and causes a flying force to be exerted. In the front section 11, a relatively large positive pressure is exerted on the front positive-pressure surface 21, while a small positive pressure is exerted on the front step surface 22. When the recording medium D starts rotating, the airflow is drawn from the front step surface 22 into a space between the slider 10 and the recording medium D, and is guided to the front positive-pressure surface 21.

With the front step surface 22 located at a level deeper than the front positive-pressure surface 21 by the depth SD1, the position of the magnetic head device 1 can be smoothly changed to a flying position in a short time when the recording medium D starts rotating. However, the depth SD1 may be zero in the present embodiment. In other words, in the present embodiment, the front step surface 22 and the front positive-pressure surface 21 may be in the same plane.

The rear section 12 is provided with a rear positive-pressure surface 31. In the rear section 12, the rear positive-pressure surface 31, which is a flat surface, is closest to the recording medium D. In the present embodiment, the rear positive-pressure surface 31 is in the same plane as the front positive-pressure surface 21. The rear positive-pressure surface 31 includes a main positive-pressure surface 31a located in a rearward position near the trailing end surface 10d and extending in the left and right direction, a left sub positive-pressure surface 31b extending in the front and rear direction continuously from the left end of the main positive-pressure surface 31a, a right sub positive-pressure surface 31c extending in the front and rear direction continuously from the right end of the main positive-pressure surface 31a, and a central sub positive-pressure surface 31d extending in the front and rear direction continuously from the middle, in the left and right direction, of the main positive-pressure surface 31a.

In one embodiment, the center that divides the rear positive-pressure surface 31 into the left and right halves is located on the centerline O-O. A front end 31e of the rear positive-pressure surface 31 is located at the rear of a boundary between the rear section 12 and the middle section 13. The front end 31e is separated from the boundary by at least one third of the front-to-rear length of the rear section 12, and preferably by at least half the front-to-rear length of the rear section 12. A rear end 31f of the rear positive-pressure surface 31 is close to the trailing end surface 10d. The magnetic functional unit 2 is located between the rear end 31f and the trailing end surface 10d.

There is a left step surface 32a between the left sub positive-pressure surface 31b and the central sub positive-pressure surface 31d, while there is a right step surface 32b between the right sub positive-pressure surface 31c and the central sub positive-pressure surface 31d. The main positive-pressure surface 31a, the left sub positive-pressure surface 31b, the right sub positive-pressure surface 31c, and the central sub positive-pressure surface 31d are all in the same plane. The left step surface 32a and the right step surface 32b are one step lower than the main positive-pressure surface 31a, the left sub positive-pressure surface 31b, the right sub positive-pressure surface 31c, and the central sub positive-pressure surface 31d, and are closer to the pressing side 10b. In the present embodiment, the left step surface 32a, the right step surface 32b, and the front step surface 22 are all in the same plane.

A raised guiding portion 34a that is in the same plane as the left sub positive-pressure surface 31b extends continuously and linearly from the left sub positive-pressure surface 31b in the front and rear direction, while a raised guiding portion 34b that is in the same plane as the right sub positive-pressure surface 31c extends continuously and linearly from the right sub positive-pressure surface 31c in the front and rear direction. The raised guiding portion 34a and the raised guiding portion 34b face each other, and are in parallel with each other. An air guiding channel 33 for guiding airflow to the rear positive-pressure surface 31 is provided between the raised guiding portion 34a and the raised guiding portion 34b. The bottom of the air guiding channel 33 is located deeper than the left step surface 32a and the right step surface 32b, and is in the same plane as a central negative-pressure surface 51 (described below) in the present embodiment.

In one embodiment, as shown in FIG. 1 and FIG. 2, the front end of the raised guiding portion 34a on the inner circumferential side extends to the boundary between the middle section 13 and the rear section 12, while the raised guiding portion 34b on the outer circumferential side extends beyond the boundary to reach the middle section 13. When the magnetic head device 1 moves to the inner circumferential side of the recording medium D as indicated by "(ID)" in FIG. 4, airflow on the surface of the recording medium D slows down. Since the raised guiding portion 34b on the outer circumferential side extends to the middle section 13, low-speed airflow can be easily guided into the air guiding channel 33 when the magnetic head device 1 moves to the inner circumferential side of the recording medium D.

In one embodiment, as shown in FIG. 2, the left-to-right width of the rear positive-pressure surface 31, for example, a left-to-right width W1 of the main positive-pressure surface 31a is larger than a width W3 of the air guiding channel 33. A spreading left-to-right width W2 of the left step surface 32a and the right step surface 32b is larger than the width W3 of the air guiding channel 33. Therefore, airflow on the surface of the recording medium D is guided into the air guiding channel 33, spread across the width W2 over the left step surface 32a and the right step surface 32b, and further guided to the main positive-pressure surface 31a with the width W1. Thus, the largest positive pressure is created across the width W1 of the main positive-pressure surface 31a. A slight positive pressure smaller than that on the main positive-pressure surface 31a is created on the left sub positive-pressure surface 31b, the right sub positive-pressure surface 31c, and the central sub positive-pressure surface 31d.

In the rear section 12, there is a rear side positive-pressure surface 35 located forward of the rear positive-pressure surface 31 and near the inner side 10e on the inner circumferential side. The rear side positive-pressure surface 35 has a main positive-pressure surface 35a that is in the same plane and is located in the rear of the rear side positive-pressure surface 35, and a sub positive-pressure surface 35b and a sub positive-pressure surface 35c that are in the same plane as the main positive-pressure surface 35a and extend forward continuously, in parallel, from the respective left and right sides of the main positive-pressure surface 35a. A side step surface 36 is located in front of the main positive-pressure surface 35a and surrounded by the sub positive-pressure surface 35b and the sub positive-pressure surface 35c. The side step surface 36 is in the same plane as the left step surface 32a and the right step surface 32b. In the rear side positive-pressure surface 35, an air guiding channel 37a extends between the sub positive-pressure surface 35c and the sub positive-pressure surface 35b. The depth of the air guiding channel 37a is the same as that of the air guiding channel 33.

Airflow on the surface of the recording medium D is guided from the air guiding channel 37a to the side step surface 36 and is further to the main positive-pressure surface 35a behind the side step surface 36. Therefore, in the rear side positive-pressure surface 35, a large positive pressure is created on the main positive-pressure surface 35a, while a slight positive pressure smaller than that on the main positive-pressure surface 35a is created on the sub positive-pressure surface 35b and the sub positive-pressure surface 35c.

A rear side positive-pressure surface 38 is located opposite the rear side positive-pressure surface 35 with respect to the centerline O-O. The rear side positive-pressure surface 38 also has a main positive-pressure surface 38a, a sub positive-pressure surface 38b, and a sub positive-pressure surface 38c. Moreover, a side step surface 39 surrounded by the main positive-pressure surface 38a, the sub positive-pressure surface 38b, and the sub positive-pressure surface 38c, and an air guiding channel 37b are provided.

Like the rear side positive-pressure surface 35, in the rear side positive-pressure surface 38, a large positive pressure is created on the main positive-pressure surface 38a, while a slight positive pressure smaller than that on the main positive-pressure surface 38a is created on the sub positive-pressure surface 38b and the sub positive-pressure surface 38c.

In the rear section 12, there is a dam portion 42 for connecting the front end of the sub positive-pressure surface 35c to the raised guiding portion 34a. The dam portion 42 extends linearly in the left and right direction. The surface of the dam portion 42 is in the same plane as the sub positive-pressure surface 35c and the surface of the raised guiding portion 34a. In the rear section 12, there is a dam portion 43 for connecting the front end of the sub positive-pressure surface 38c to the raised guiding portion 34b. The dam portion 43 extends linearly in the left and right direction. The surface of the dam portion 43 is in the same plane as the sub positive-pressure surface 38c and the surface of the raised guiding portion 34b.

In the rear section 12, a rear negative-pressure surface 41 extends over the area except the rear positive-pressure surface 31, the rear side positive-pressure surfaces 35 and 38, the raised guiding portions 34a and 34b, and the air guiding channel 33. The rear negative-pressure surface 41 is a flat surface that is at a deeper level than the main positive-pressure surfaces 31a, 35a, and 38a. A depth SD2 from the main positive-pressure surfaces 31a, 35a, and 38a to the rear negative-pressure surface 41 is larger than the depth SD1 from the front positive-pressure surface 21 to the front step surface 22.

In the rear section 12, an area surrounded by the raised guiding portion 34a, the sub positive-pressure surface 35c, and the dam portion 42 is a side negative-pressure-generating area 45 in which a large negative pressure is created. In particular, the largest negative pressure is created immediately behind the dam portion 42. An area surrounded by the raised guiding portion 34b, the rear side positive-pressure surface 38, and the dam portion 43 is a side negative-pressure-generating area 46 in which a large negative pressure is created. For example, the largest negative pressure is created immediately behind the dam portion 43. A slight negative pressure smaller than that created in the side negative-pressure-generating areas 45 and 46 is created at a position rearward of the main positive-pressure surface 38a of the rear side positive-pressure surface 38 and at a position rearward of the main positive-pressure surface 35a of the rear side positive-pressure surface 35.

In the middle section 13, there is the flat central negative-pressure surface 51 that is at a deeper level than the front positive-pressure surface 21. In the area behind the front positive-pressure surface 21, there are a rib 52 and a rib 53 on the respective left and right sides. The ribs 52 and 53 extend rearward continuously from the front positive-pressure surface 21. The surfaces of the ribs 52 and 53 are lower than the front positive-pressure surface 21. In the present embodiment, the surfaces of the ribs 52 and 53 are in the same plane as the front step surface 22.

The depth SD3 from the front positive-pressure surface 21 to the central negative-pressure surface 51 is larger than the depth SD2 from the main positive-pressure surfaces 31a, 35a, and 38a to the rear negative-pressure surface 41. However, the central negative-pressure surface 51 is designed such that a negative pressure smaller than that created in the side negative-pressure-generating areas 45 and 46 is created behind the front positive-pressure surface 21. In the present embodiment, an area surrounded by the rear end 21b of the front positive-pressure surface 21 and the ribs 52 and 53 is a central negative-pressure-generating area 54.

Figure 5:
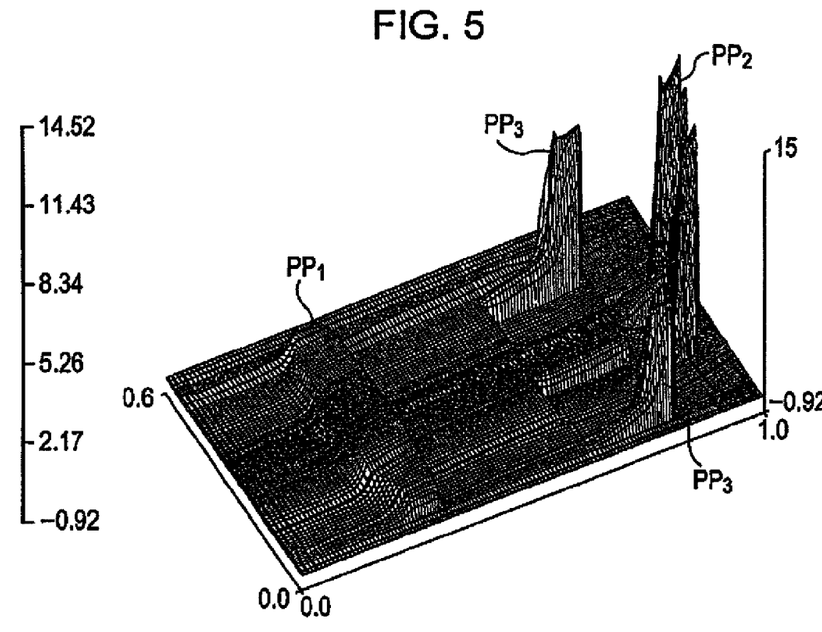
FIG. 5 is a perspective view of a simulation result showing the distribution of positive and negative pressures exerted on a facing side of a slider.
Figure 6:
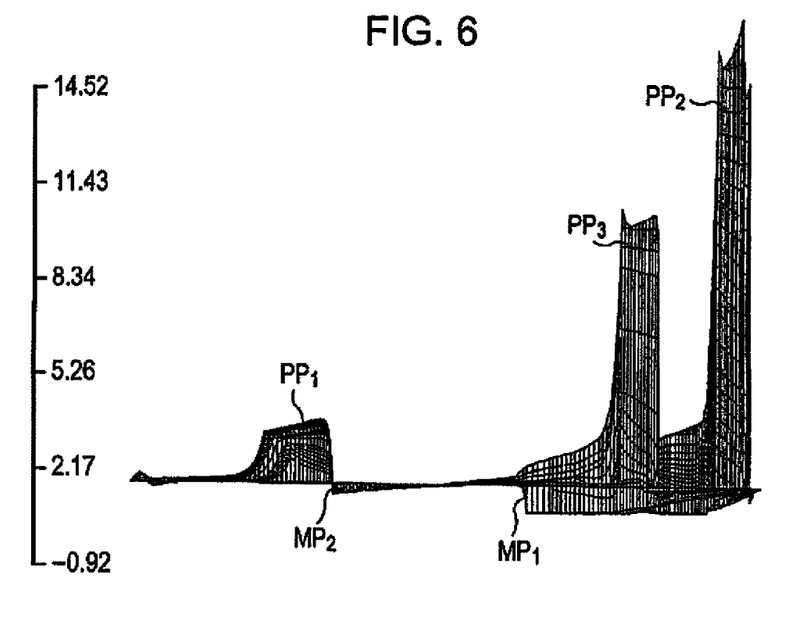
FIG. 6 is a side view of the simulation result shown in FIG. 5.

FIG. 5 and FIG. 6 show positive and negative pressures created on each surface in the facing side 10a of the magnetic head device 1 when the facing side 10a faces the recording medium D.

FIG. 5 and FIG. 6 each show a result of a simulation based on a computer analysis for one embodiment. In the simulation, the lengths of the longer and shorter sides of the slider 10 are set to 1235 μm and 700 μm, respectively. The depth SD1, the depth SD2, and the depth SD3 are set to 0.15 μm, 1 μm, and 3 μm, respectively. The pressing force (load pressure) exerted on the contact point 7a and directed toward the recording medium D is set to 24.5 mN. The number of revolutions of the recording medium D is set to 5400 rpm. The air density is set to one atmospheric pressure.

In one embodiment, as shown in FIG. 5 and FIG. 6, a large positive pressure PP1 is created on the front positive-pressure surface 21 in the front section 11 of the magnetic head device 1. In the rear section 12, a large positive pressure PP2 is exerted on the main positive-pressure surface 31a, while a large positive pressure PP3 is created on the main positive-pressure surfaces 35a and 38a of the rear side positive-pressure surfaces 35 and 38 located on the corresponding sides of the main positive-pressure surface 31a. Moreover, in the rear section 12, a large negative pressure MP1 is created in the side negative-pressure-generating areas 45 and 46 located on the respective left and right sides, while a negative pressure MP2 smaller than the negative pressure MP1 is created in the central negative-pressure-generating area 54.

The positive pressure PP2 created on the main positive-pressure surface 31a is larger than the positive pressure PP3 created on each of the main positive-pressure surfaces 35a and 38a. The side negative-pressure-generating areas 45 and 46 are located forward of the main positive-pressure surfaces 31a, 35a, and 38a. The front end of the generating area of the large negative pressure MP1 is located forward of the front end of the generating area of the positive pressure PP2, and is located forward of the front end of the generating area of the positive pressure PP3. The generating area of the positive pressure PP3 is located forward of the generating area of the positive pressure PP2, and the front end of the generating area of the positive pressure PP3 is located forward of the front end of the generating area of the positive pressure PP2.

In the magnetic head device 1, airflow directed from the leading end to the trailing end of the slider 10 and drawn into the space between the front step surface 22 and the recording medium D causes the leading end surface 10c to move upward immediately after the recording medium D starts rotating. Airflow running from the leading end to the trailing end, between the facing side 10a of the slider 10 and the recording medium D, causes the leading end surface 10c to be farther from the recording medium D than the trailing end surface 10d is from the recording medium D, as shown in FIG. 3, thereby bringing the slider 10 to a flying position having a predetermined pitch angle.

In the flying position shown in FIG. 3, flying force is exerted on the slider 10, at the generating points of the positive pressures PP1, PP2, and PP3. This supports the slider 10 from underneath and allows the slider 10 to be stabilized and kept at a position away from the recording medium D. For example, the slider 10 is supported, from underneath, at two points, one at the generating point of the positive pressure PP1 on the front and the other at the generating point of the positive pressure PP2 on the rear. In addition, the slider 10 is supported at the generating points of the positive pressure PP3 located forward and on the respective left and right sides of the generating point of the positive pressure PP2. Flying force exerted on the generating points of the positive pressure PP3 allows the slider 10 to maintain a stable flying position, thereby reducing variations in roll angle about the centerline O-O.

For the tilting slider 10 with a certain pitch angle, airflow hits the middle area between the generating area of the positive pressure PP1 and the generating area of the positive pressure PP2. However, in this middle area, there is a front area in which the low negative pressure MP2 is generated and a rear area in which the relatively large negative pressure MP1 is generated. Attractive force exerted on the generating areas of the negative pressures MP2 and MP1 and directed toward the recording medium D prevents the pitch angle of the slider 10 from increasing. Moreover, the relatively large negative pressure MP1 is generated on the trailing side of this middle area. Since attractive force is exerted on the area where the negative pressure MP1 is generated, the trailing end surface 10d is prevented from being excessively lifted. This allows a distance between the magnetic functional unit 2 and the surface of the recording medium D to be kept to a minimum.

When the magnetic head device 1 is used, for example, at a high altitude or in an airplane, and air density in the use environment of the magnetic head device 1 decreases, the positive pressures PP1, PP2, and PP3 and flying force exerted on the generating areas of the positive pressures PP1, PP2, and PP3 decrease. However, attractive force exerted on the generating areas of the negative pressures MP2 and MP1 and directed toward the recording medium D also decreases. Since a reduction in flying force exerted on positive-pressure-generating areas is balanced with a reduction in attractive force, considerable variations in the flying position of the slider 10 and a considerable reduction in flying distance can be prevented.

In the middle area between the generating areas of the positive pressures PP1 and PP2, the small negative pressure MP2 is generated in the central negative-pressure-generating area 54 distant from the recording medium D, while the large negative pressure MP1 is generated in the side negative-pressure-generating areas 45 and 46 on the trailing side. When air density decreases, a corresponding decrease in negative pressure MP2 prevents large changes in pitch angle, while a corresponding decrease in attractive force exerted on the generating area of the negative pressure MP1 prevents the trailing end surface 10d from being lowered excessively.

In the present embodiment, the large negative pressure MP1 is generated in the side negative-pressure-generating areas 45 and 46 that are forward of the main positive-pressure surface 31a where the positive pressure PP2 is generated, while the moderate positive pressure PP3 is generated in the main positive-pressure surfaces 35a and 38a of the respective rear side positive-pressure surfaces 35 and 38 that are slightly rearward and on the respective left and right sides of the side negative-pressure-generating areas 45 and 46. When air density decreases, a decrease in flying force exerted on the generating area of the positive pressure PP3 and a decrease in attractive force exerted on the generating area of the negative pressure MP1 are balanced in a position forward of the generating area of the positive pressure PP2. Therefore, even if the positive pressure PP2 on the trailing side decreases, the slider 10 is stably supported from underneath in the generating area of the positive pressure PP3 and negative pressure MP1. This prevents an excessive decrease in flying distance between the magnetic functional unit 2 and the surface of the recording medium D.

As described above, in the direction from the leading to trailing sides of the slider 10, pressures such as the "moderate positive pressure PP1", "small negative pressure MP2", "large negative pressure MP1", "moderate positive pressure PP3", and "large positive pressure PP2" are generated. This reduces, when air density decreases, variations in flying position (variations in pitch angle), a decrease in the flying height of the magnetic functional unit 2, and variations in roll angle.

Figure 11:
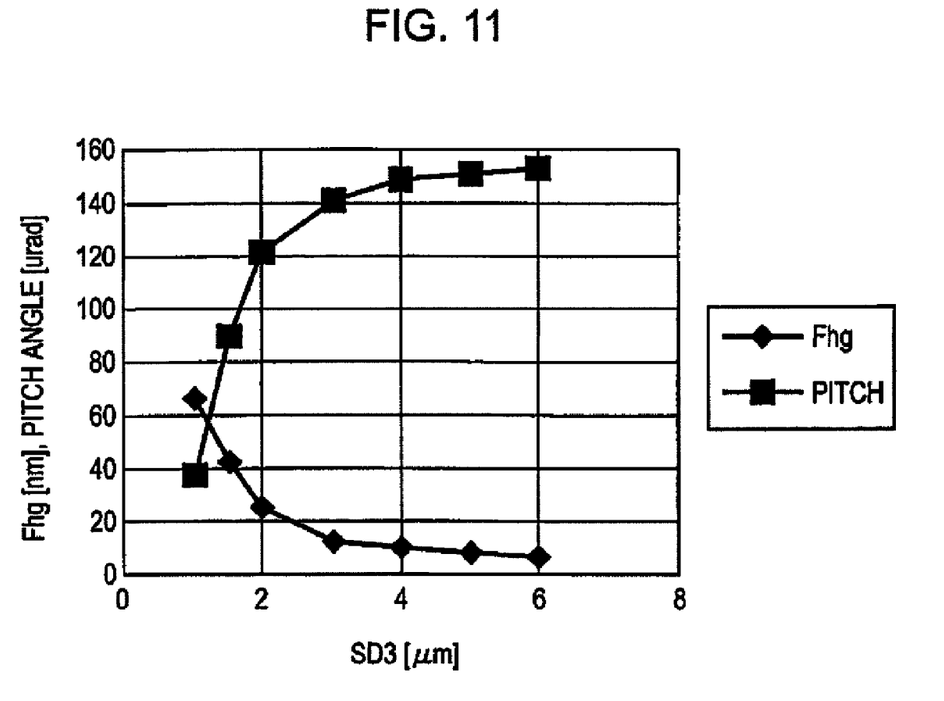
FIG. 11 is a graph showing a relationship between variations in pitch angle and the flying distance.

FIG. 11 shows a relationship between changes in the pitch angle of the slider 10 and the resulting changes in the flying height of the trailing end surface 10d. The horizontal axis represents the depth SD3, while the vertical axis represents the flying height (Fhg) of the trailing end surface 10*d* and the pitch angle of the slider 10. As shown in FIG. 11, the flying height of the trailing end surface 10*d* decreases as the pitch angle of the slider 10 increases. In the magnetic head device 1, in the middle area between the generating areas of the positive pressures PP1 and PP2, the small negative pressure MP2 is generated at the front, the large negative pressure MP1 is generated behind the negative pressure MP2, and the positive pressure PP3 is generated on both sides of the generating area of the negative pressure MP1. This stabilizes the pitch angle of the slider 10 in the flying position and prevents an excessive decrease in flying height when air density decreases.

Figure 7:
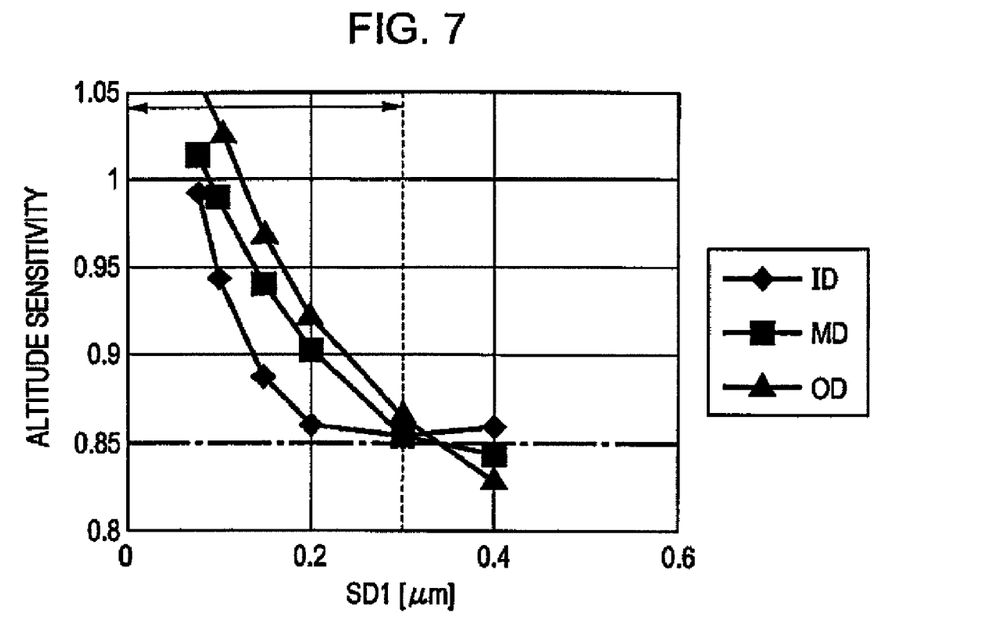
FIG. 7 is a graph of a simulation result showing a relationship between a depth SD1 and variations in flying distance.
Figure 8:
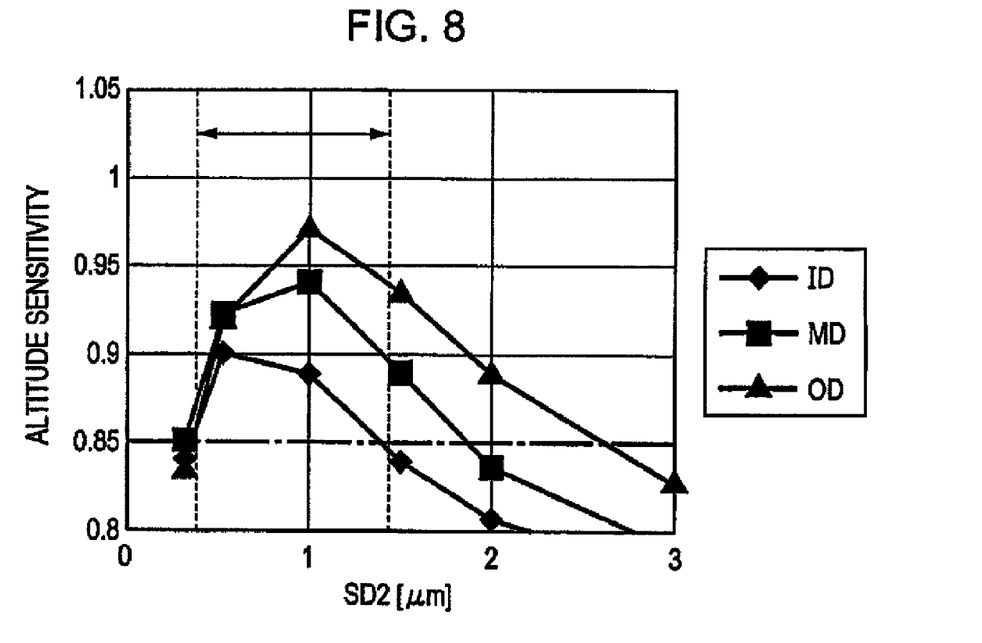
FIG. 8 is a graph of a simulation result showing a relationship between a depth SD2 and variations in flying distance.
Figure 9:
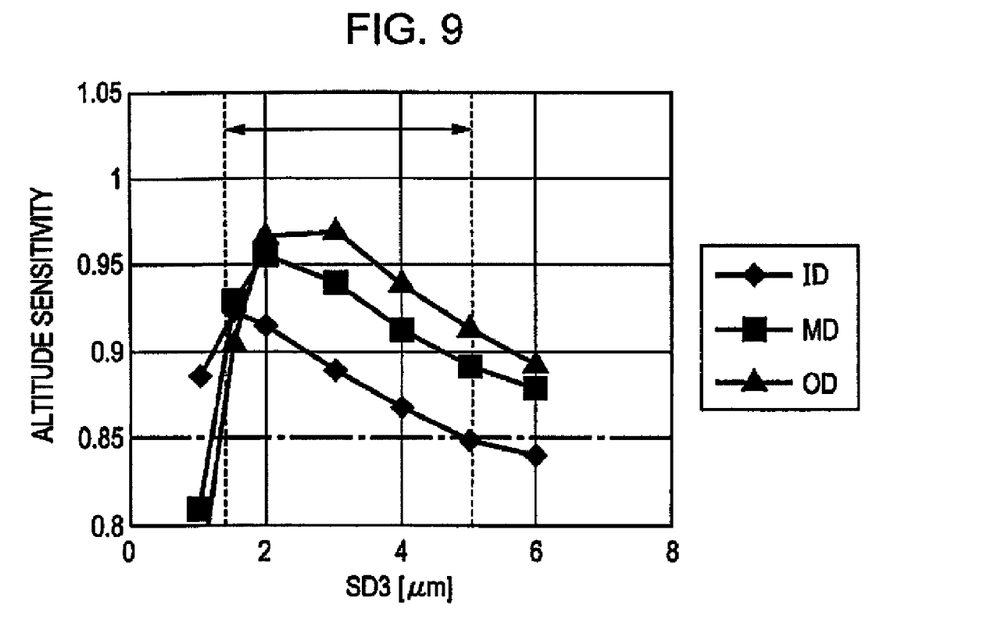
FIG. 9 is a graph of a simulation result showing a relationship between a depth SD3 and variations in flying distance.

Table 1 and FIGS. 7 to 9 show the results of simulations for identifying the relationship between the flying height of the slider 10 (i.e., the flying distance of the trailing end surface 10*d* from the surface of the recording medium D) and each of the depths SD1, SD2, and SD3 shown in FIG. 1. Factors other than the depths SD1, SD2, and SD3 are set to be the same as those in the simulations of the positive and negative pressures shown in FIG. 5 and FIG. 6.

The upper rows of Table 1 show the flying heights of the trailing end surface 10*d* when the value of the depth SD1 (μm) is varied. Table 1 contains numbers that represent the ratios of the respective flying heights at a pressure of 0.7 atmospheres to the flying height at a pressure of one atmosphere when the flying height at a pressure of one atmosphere is set to "1". In Table 1, according to FIG. 4, an "ID" column contains the above-described ratios of the respective flying heights when the magnetic head device 1 is located at the innermost radius of the recording medium D, an "OD" column contains the above-described ratios of the respective flying heights when the magnetic head device 1 is located at the outermost radius of the recording medium D, and an "MD" column contains the above-described ratios of the respective flying heights when the magnetic head device 1 is located in the middle of the ID and OD in FIG. 4.

In this simulation, the depth SD2 and the depth SD3 are fixed at 1 μm and 3 μm, respectively, while the depth SD1 is varied. FIG. 7 is a graphic representation of the upper rows of Table 1. The horizontal axis represents the size (μm) of the depth SD1, while the vertical axis represents the ratio of the flying height at a pressure of 0.7 atmospheres when the flying height at a pressure of one atmosphere is set to "1".

The middle rows of Table 1 numerically show variations in flying height when the value of the depth SD2 is varied while the depth SD1 and the depth SD3 are fixed at 0.15 μm and 3 μm, respectively. FIG. 8 is a graphic representation of the middle rows of Table 1. The bottom rows of Table 1 numerically show variations in flying height when the value of the depth SD3 is varied while the depth SD1 and the depth SD2 are fixed at 0.15 μm and 1 μm, respectively. FIG. 9 is a graphic representation of the bottom rows of Table 1.

Figure 10:
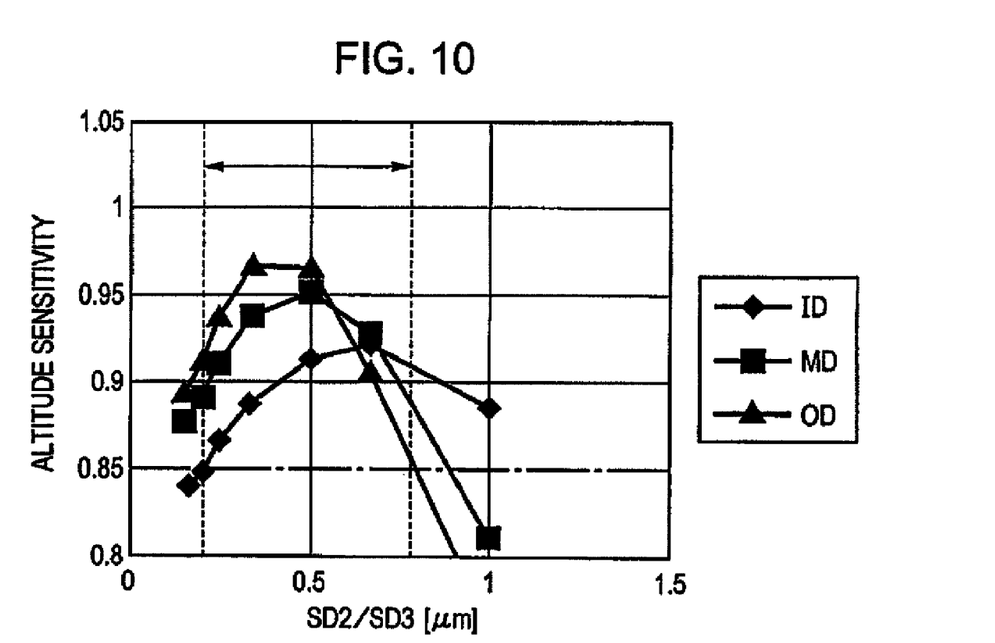
FIG. 10 is a graph of a simulation result showing a relationship between the ratio of the depth SD2 to the depth SD3 (SD2/SD3) and variations in flying distance.

Table 2 shows a relationship between changes in flying height and the ratios of the values of the depth SD2 to the respective values of the depth SD3 (i.e., SD2/SD3) when the value of the depth SD3 is varied while the depth SD1 and the depth SD2 are fixed at 0.15 μm and 1 μm, respectively. FIG. 10 is a graphic representation of Table 2. The horizontal axis represents the ratio of the depth SD2 to the depth SD3 (i.e., SD2/SD3), while the vertical axis represents the ratio of the flying height at a pressure of 0.7 atmospheres when the flying height at a pressure of one atmosphere is set to "1".

Referring to Table 1, Table 2, and FIG. 7 to FIG. 10, in order to keep the ratio of the flying height when the magnetic head device 1 is used under a pressure of 0.7 atmospheres to the flying height under a pressure of one atmosphere (when the flying height under a pressure of one atmosphere is set to "1") at "0.85" or above, which is practically permissible, it is preferable that the depth SD2 from the rear positive-pressure surface 31 to the rear negative-pressure surface 41 falls within the range of 0.5 μm to 1.4 μm, while the depth SD3 from the front positive-pressure surface 21 to the central negative-pressure surface 51 falls within the range of 1.2 μm to 5.0 μm. Referring to FIG. 10, it is preferable that the ratio of the depth SD2 to the depth SD3 falls within the range of 0.2 to 0.8.

Setting the depth SD2 and the depth SD3 within the ranges described above allows the negative pressure MP2 generated in the central negative-pressure-generating area 54 to be balanced with the negative pressure MP1 generated in the side negative-pressure-generating areas 45 and 46. This stabilizes the flying position (pitch angle) of the slider 10 and reduces changes in the flying height of the trailing end surface 10*d* when air density decreases.

Referring to FIG. 7, it is preferable that the depth SD1 from the front positive-pressure surface 21 to the front step surface 22 be less than or equal to 0.3 μm. As shown in FIG. 11, since the flying height of the trailing end surface 10*d* decreases as the pitch angle of the slider 10 increases, some degree of increase in the depth SD1 and a decrease in the positive pressure PP1 exerted on the front positive-pressure surface 21 have no significant impact on the flying distance. However, if the depth SD1 exceeds 0.3 μm, an excessive decrease in pitch angle in the flying position has a negative impact on the flying distance. Therefore, it is preferable that the depth SD1 from the front positive-pressure surface 21 to the front step surface 22 be less than or equal to 0.3 μm.

TABLE 1

| Depth from Positive Pressure Surface | OD | MD | ID |
|---|---|---|---|
| SD1 (μm) | | | |
| 0.08 | 1.063 | 1.013 | 0.993 |
| 0.1 | 1.027 | 0.988 | 0.943 |
| 0.15 | 0.969 | 0.939 | 0.887 |
| 0.2 | 0.923 | 0.9 | 0.86 |
| 0.3 | 0.864 | 0.854 | 0.853 |
| 0.4 | 0.83 | 0.841 | 0.859 |
| SD2 (μm) | | | |
| 0.3 | 0.832 | 0.847 | 0.835 |
| 0.5 | 0.918 | 0.922 | 0.897 |
| 1 | 0.969 | 0.939 | 0.887 |
| 1.5 | 0.934 | 0.887 | 0.836 |
| 2 | 0.887 | 0.833 | 0.804 |
| 3 | 0.825 | 0.79 | 0.783 |
| SD3 (μm) | | | |
| 1 | 0.766 | 0.807 | 0.884 |
| 1.5 | 0.905 | 0.926 | 0.921 |
| 2 | 0.967 | 0.952 | 0.913 |
| 3 | 0.969 | 0.939 | 0.887 |
| 4 | 0.939 | 0.911 | 0.866 |
| 5 | 0.914 | 0.889 | 0.845 |
| 6 | 0.893 | 0.877 | 0.837 |

TABLE 2

| SD2/SD3 | OD | MD | ID |
|---|---|---|---|
| 1 | 0.766 | 0.807 | 0.884 |
| 0.667 | 0.905 | 0.926 | 0.921 |
| 0.5 | 0.967 | 0.952 | 0.913 |
| 0.333 | 0.97 | 0.939 | 0.887 |
| 0.25 | 0.939 | 0.911 | 0.867 |

TABLE 2-continued

| SD2/SD3 | OD | MD | ID |
|---|---|---|---|
| 0.2 | 0.914 | 0.889 | 0.845 |
| 0.167 | 0.893 | 0.877 | 0.837 |

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

What is claimed is:

1. A magnetic head device comprising:
a slider having a facing side that faces a recording medium and a pressing side on which pressing force directed toward the recording medium is exerted; and
a magnetic functional unit mounted on a trailing side of the slider and configured to perform a magnetic recording function, a magnetic reproducing function, or both;
wherein the facing side of the slider has a front section located on a leading side of the slider, a rear section located on the trailing side, and a middle section between the front section and the rear section;
the front section is provided with a front positive-pressure surface; the rear section is provided with a rear positive-pressure surface, a rear negative-pressure surface that is closer to the pressing side than the rear positive-pressure surface is, blocking portions located in front of the rear negative-pressure surface, and rear side positive-pressure surfaces between which a centerline extends from the leading side to the trailing side;
the middle section is provided with a central negative-pressure surface that is closer to the pressing side than the front positive-pressure surface is and configured to cause a negative pressure to develop on at least a boundary with the front positive-pressure surface;
a depth (SD3) from the front positive-pressure surface to the central negative-pressure surface is larger than a depth (SD2) from the rear positive-pressure surface to the rear negative-pressure surface;
a direction along the centerline is referred to as a front and rear direction, and a direction orthogonal to the front and rear direction is referred to as a left and right direction,
the rear positive-pressure surface comprises a main positive-pressure surface located in a reward position near the trailing side and extending in the left and right direction, a left sub positive-pressure surface extending in the front and rear direction continuously from the left end of the main positive-pressure surface toward the middle section, a right sub positive-pressure surface extending in the front and rear direction continuously from the right end of the main positive-pressure surface toward the middle section, and a central sub positive-pressure surface extending in the front and rear direction continuously from the middle in the left and right direction of the main positive-pressure surface toward the middle section,
raised guiding portions extend in the front and rear direction toward the middle section continuously from each of the left sub positive-pressure surface and the right sub positive-pressure surface, and each of the raised guiding portions is connected to each of the blocking portions, and an air guiding channel continuously connected to the central negative-pressure surface is provided between the raised guiding portions,
a left step surface is formed between the left sub positive-pressure surface and the central sub positive-pressure surface and a right step surface is formed between the right sub positive-pressure surface and the central sub positive-pressure surface, and the left and right step surfaces are formed lower from the rear positive-pressure surface in a depth smaller than either of the depth (SD2) and (SD3),
a spreading left-to-right width (W2) of the left and right step surfaces is larger than a width (W3) of the air guiding channel,
the front section is provided with a front step surface in front of the front positive-pressure surface, and
a depth from the rear positive-pressure surface to the rear negative-pressure surface is larger than a depth from the front positive-pressure surface to the front step surface.

2. The magnetic head device according to claim 1, wherein airflow over the recording medium causes a flying force to be exerted on the front positive-pressure surface and the rear positive-pressure surface;
the rear negative-pressure surface and the central negative-pressure surface cause attractive force toward the recording medium to develop; and
attractive force created on the rear negative-pressure surface is larger than that created on the central negative-pressure surface.

3. The magnetic head device according to claim 2, wherein a front end of an area in which the flying force is exerted on the rear positive-pressure surface and a front end of an area in which attractive force is created on the rear negative-pressure surface are spaced in a front and rear direction.

4. The magnetic head device according to claim 1, wherein a depth from the front positive-pressure surface to the central negative-pressure surface falls within the range of about 1.2 μm to 5.0 μm, and a depth from the rear positive-pressure surface to the rear negative-pressure surface falls within the range of about 0.5 μm to 1.4 μm.

5. The magnetic head device according to claim 1, wherein the ratio of a depth between the rear positive-pressure surface and the rear negative-pressure surface to a depth between the front positive-pressure surface to the central negative-pressure surface falls within the range of about 0.2 to 0.8.

6. The magnetic head device according to claim 1, wherein a depth from the front positive-pressure surface to the front step surface is greater than 0 μm and equal to or less than 0.3 μm.

7. The magnetic head device according to claim 1, wherein the rear side positive-pressure surfaces are located on corresponding sides of the rear negative-pressure surface.

8. The magnetic head device according to claim 1, further comprising air guiding channels that extend from the middle section to the corresponding rear side positive-pressure surfaces.

9. The magnetic head device according to claim 1, wherein positive pressure (PP2) created on the rear positive-pressure surface is larger than positive pressure (PP3) created on each of the rear side positive-pressure surfaces.

10. The magnetic head device according to claim 9, wherein a front end of a generating area of a negative pressure (MP1) created on the rear negative-pressure surface is located forward of a front end of a generating area of the positive pressure (PP2) and is located forward of a front end of a generating area of the positive pressure (PP3), and the front end of the generating area of the positive pressure (PP3) is located forward of the front end of the generating area of the positive pressure (PP2).

* * * * *